United States Patent Office  3,468,292
Patented Sept. 23, 1969

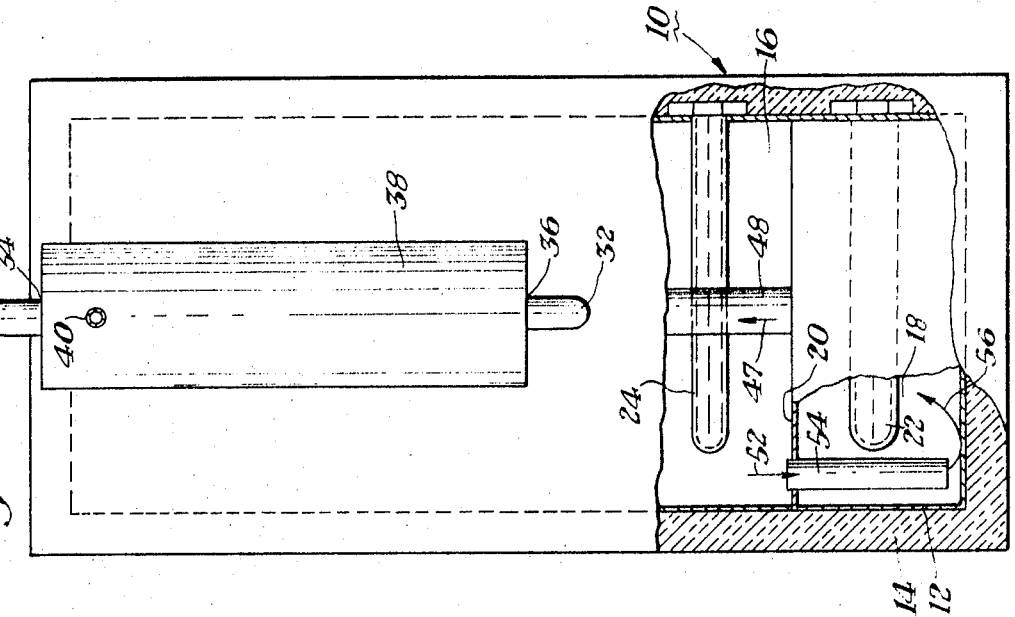
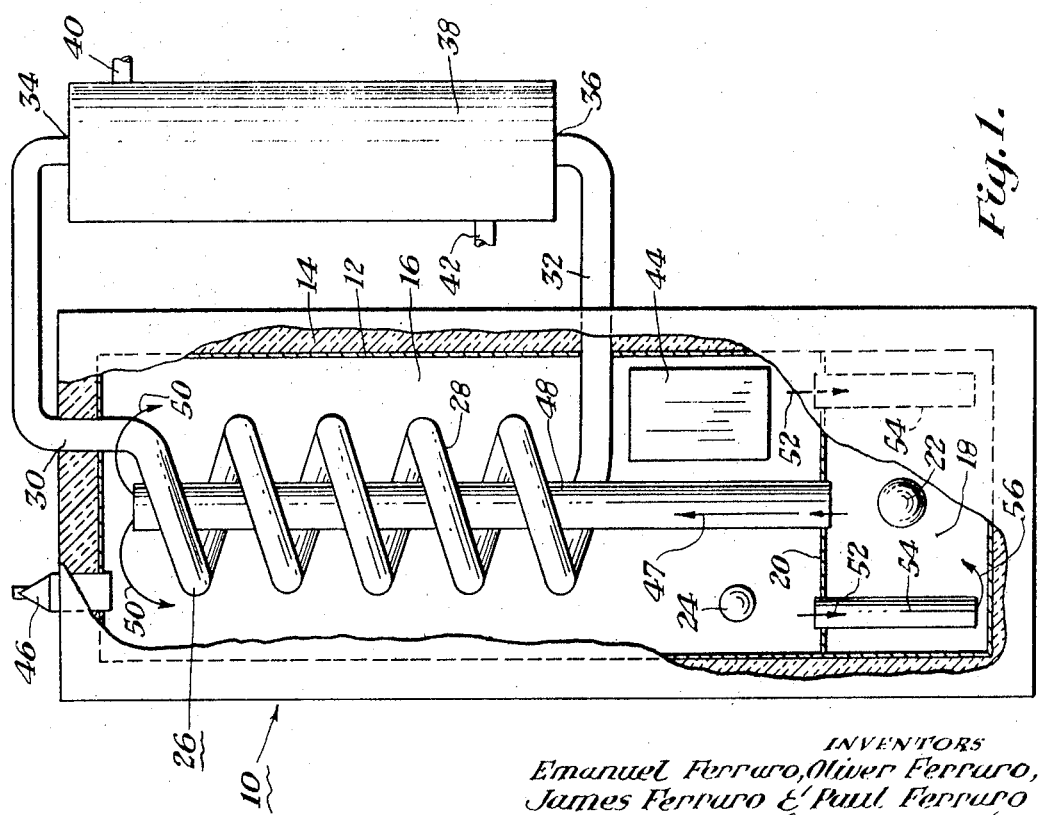

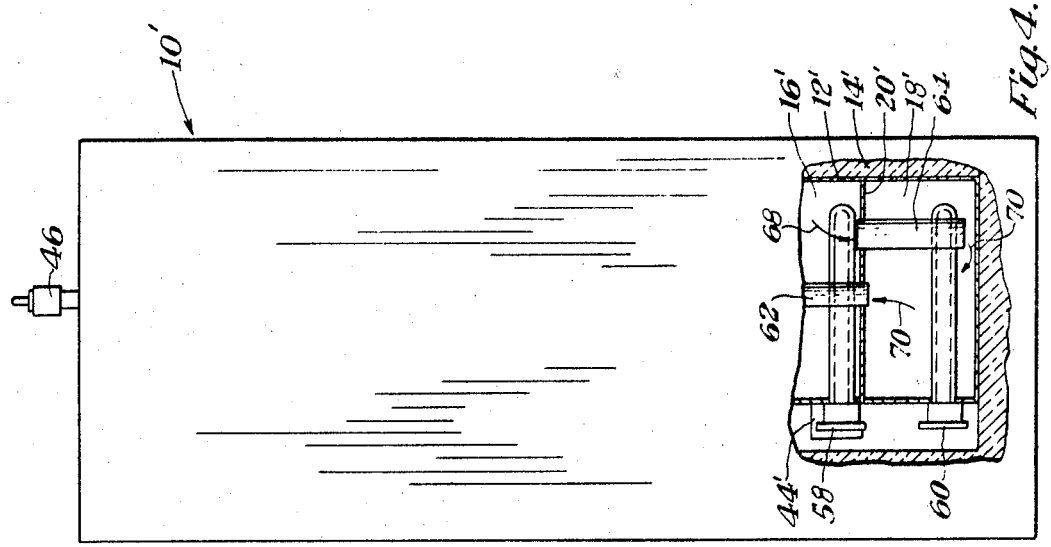
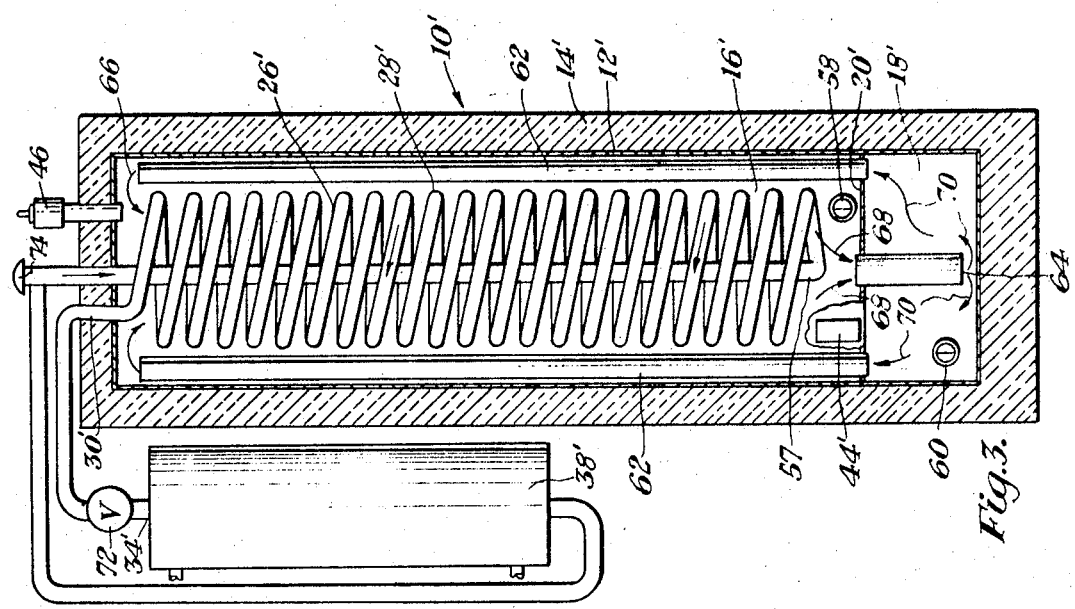

3,468,292
DOMESTIC HOT WATER HEATER
Emanuel Ferraro, Oliver Ferraro, James Ferraro, and Paul Ferraro, all of 916 Baldwin St., Pittsburgh, Pa. 15234
Filed Sept. 22, 1967, Ser. No. 669,898
Int. Cl. F22b 1/02
U.S. Cl. 122—33                                  10 Claims

ABSTRACT OF THE DISCLOSURE

The subject of the invention is an efficient hot water heater for domestic use and the like wherein the tank is divided into an upper heat exchanger compartment and a lower heating compartment. Heat exchange water is circulated in a closed circuit, including riser and return conduits between the two compartments. A heating element is mounted in the lower compartment and desirably a second or auxiliary heating element is mounted in the lower portion of the upper heat exchange compartment to prevent the heat exchange water from being returned to the heating compartment at too low a temperature. Heat exchange means such as a helical conduit for output water is mounted in the heat exchange compartment. Desirably the volume of the helical compartment is made substantially equal to the volume of the heating compartments for improved efficiency. For maximum efficiency the aforementioned auxiliary heater and the equal volumes are both utilized.

---

The present invention relates to domestic hot water heaters. More particularly our invention relates to water heating devices using the principle of heat exchange to heat the water, in which the heating water is circulated from a lower compartment to an upper compartment by means of conduction.

In those water heating systems which have been suggested previously or are presently in use, a common problem is exhibited in that a sufficient return of hot water is not obtained for the amount of energy expended in heating the water. In the typical heat exchange type of heater, this problem arises in increasing the temperature of the circulating heating water after it has been in a heat exchange relationship with the output water being heated. These difficulties are occasioned by the fact that the heat exchange water returns at too low a temperature, and therefore requires considerable expenditure of energy to restore the circulating water to the desired temperature.

We overcome these difficulties of the prior art and obtain a considerable increase in operating efficiency in our water heater by providing means for heating only that volume of the circulating or heat exchange which is equal to the volume of the output water drawn from the water heater. One arrangement of such means included making the volume of circulating water in the lower compartment of the water heater approximately equal to the volume of output water being heated within the heater. We obtain a further increase in efficiency by providing means capable of commencing the reheating of the circulating water before it is returned to the lower compartment where it would otherwise begin its next heating cycle.

In an exemplary form of water heater constructed in accordance with our invention, we prefer to provide a tank having an upper compartment and a lower, smaller compartment, with the entire tank being enclosed within suitable insulation material. We further prefer to provide an electric immersion element within the lower compartment. A circulating pipe is preferably disposed to extend from the upper portion of the lower compartment conduit having an input and output to a separate storage to the upper portion of the upper compartment. A coiled tank preferably surrounds the circulating pipe. The contained water volume of that portion of the coil inside the upper compartment is approximately equal to that portion within the lower compartment.

We also prefer to provide a second heating element near the bottom of the upper compartment. In one arrangement the second heating element has about half the heat output of the first-mentioned element, while in other arrangements the elements can be of equal capacities. For examples, the lower heating element can be about 3,000 watts while the upper heating element can be about 1,500 watts or both elements can be about 6,000 watts. Return conduits are preferably extended from the bottom of the upper compartment to the bottom of the lower compartment. An immersion aquastat can be provided to control the operation of the heating elements. A vent and fill line can be provided at the top of the tank to relieve overpressures in the system and to fill the tank when necessary.

Basically, our novel water heater comprises a tank having an upper heat exchanging compartment and a lower heating compartment, heat-producing means in said lower compartment, heat exchange means mounted in said heat exchange compartment and coupled to external hot water utilizing equipment, at least one riser pipe coupling the upper region of said lower compartment with the upper region of said upper compartment, and at least one return pipe coupling the lower region of said upper compartment with the lower region of said lower compartment. In certain applications auxiliary heat-producing means are mounted within the lower region of said upper compartment, so that heat exchange water circulating through said compartment is preheated in said upper compartment lower region before being returned to said lower compartment or the volume of output water contained within said heat exchanger means is about equal to the volume of heat exchange water contained within said lower compartment. For maximum efficiency a combination of these novel features is preferably employed.

FIGURE 1 is an elevational view of one form of water heater arranged in accordance with our invention, with the casing structure being broken away and other parts being sectioned to show the invention more clearly.

FIGURE 2 is another elevational view of the apparatus shown in FIGURE 1 taken substantially at right angles to the view of FIGURE 1, with parts being broken away and other parts being sectioned.

FIGURE 3 is a view similar to that of FIGURE 1 showing another form of the water heater arranged in accordance with our invention.

FIGURE 4 is a view similar to that of FIGURE 2 but showing the apparatus of FIGURE 3.

Referring now to FIGURES 1 and 2 of the drawings in greater detail, an exemplary water heater 10 shown therein comprises a casing 12 with a suitable insulated jacket 14 and divided into an upper compartment 16 and a lower compartment 18 by partition 20. The lower compartment 18 is provided with an electric immersion type heating element 22 of conventional design positioned centrally thereof. A similar electric heating element 24 desirably is positioned near the bottom of the upper compartment 16. In this example, the upper or secondary heating element 24 can be provided with approximately half of the capacity of the lower or primary heating element 22.

The lower compartment 18, then, is the primary heating chamber for the heat exchange water within the upper and lower compartment 16 and 18. An output heating coil 26 is immersed within the upper compartment 16 and includes in this example a helical conduit 28 having an outlet 30 and an inlet 32, coupled respectively to inlet and outlet ports 34 and 36 of storage tank 38. The storage tank is provided also with a supply outlet 40 and return port 42 by which the tank 38 is connected to external hot water utilizing equipment (not shown).

In most application the storage tank 38 (or 38' of FIGURES 3 and 4) can be omitted and the heat exchanging means 26 can be coupled directly to outlet faucets (not shown) or other hot water utilizing equipment. This is made possible by the very rapid recovery characteristic of the water heater 10. The recovery characteristic is improved through the use of an auxiliary heating element 58 as described below. Further improvement in the recovery characteristic is made possible by sizing the upper and lower compartments 16 and 18 so that the volume of the lower compartment 18 is a minor fraction of that of the upper compartment 16, as shown in the drawings.

It will be understood, of course, that the size of the components described thus far, particularly heating coil 26 can be varied depending upon the extent of hot water demand contemplated.

The hot water heater 10 desirably is provided with an immersion aquastat coupled in the supply circuit (not shown) for the immersion heaters 22, 24 to control the operation of the electric heaters and the temperature of the output water. If desired, the aquastat 44 can be employed as an upper limit switch for the heaters 22, 24 and a second aquastat (not shown) can be inserted into the storage tank 38, and coupled with the aquastat 44. Desirably also the tank 12 is provided with a vent and fill cap 46 by which the compartments 16 and 18 are filled and air is removed therefrom during the filling process.

The water heated by the primary heater 22 rises by convection through a riser tube or standpipe 48 and circulates thru storage tank 38. The riser 48 in this example is disposed coaxially of helical conduit 28.

The circulating heat exchange water which has been reheated by the heating element 22 rises as denoted by arrow 47 through standpipe 48 which is coupled adjacent the midpoint of partition 20 to the upper region of the lower compartment 18. From the upper end of standpipe 48 the circulating heat exchange water exits as denoted by flow arrows 50 and flows downwardly through and around the individual turns of the helical conduit 28 toward the bottom of the upper compartment 16, in generally countercurrent flow relation to the heated output water flowing upwardly thru coil 28. From the bottom of the upper compartment 16 the recirculating water flows downwardly as denoted by flow arrows 52 through downcomers or standpipes 54 which couple the bottom region of the upper compartment 16 to the bottom region of the lower or primary heating compartment 18. As better shown in FIGURE 2 the recirculating water exits from the lower end of the shorter standpipes 54 and then flows upwardly past the primary heating element 22 as denoted by flow arrow 56. Although two such standpipes 54 are shown, it is contemplated that a greater or lesser number can be employed depending upon the flow requirements. Desirably, the combined flow capacity of the downcomers 54 is equal to the flow capacity of the riser tube 48.

We have found that the efficiency of our water heater, as thus far described, is increased considerably by the provision of the auxiliary or secondary heating element 24 in the lower regions of the upper or heat exchange compartment 16. This arrangement prevents the return of circulating or heat exchange water to the primary heating compartment 18 at too low a temperature and thus permits the primary heating element 22 to operate much more efficiently, without the expenditure of maximum output over extended periods to raise low temperature water to the desired temperature. We have also found, in certain sizes of water heater, that the auxiliary heating element 24 can be provided with a lower capacity than that of the primary heating element 22 and still accomplish its desired purpose. For example, the capacity of the secondary heating element 24 can be reduced to approximately half that of the primary heating element 22 or less without substantial impairment in operating efficiency afforded by use of the secondary heating element.

We have also found that the efficiency of our novel water heater is significantly increased when the volume of the lower or primary heating compartment 18 is made approximately equal to the total volume of water contained within the helical conduit 28.

Along the same line, our experimentation has indicated that peak efficiency results from the employment of both of these discoveries in a single water heater. That is to say, in an experimental model using primary and secondary heating elements 22, 24 as described herein and in which the liquid volume of the primary heating compartment 18 about equals the liquid volume of the helical conduit 28, we have obtained an efficiency of about 89%. Similar efficiencies are obtainable with the hot water heater described below in connection with FIGURES 3 and 4 and modified in accord with our mention for large outputs.

In FIGURES 3 and 4 a hot water heater 10' of larger capacity is illustrated, and similar components are denoted by similar reference characters with primed accents. In the water heater 10' a heat exchange coil 26' is formed from a helical conduit 28' of relatively smaller diameter but a larger number of turns to accommodate the additional heating capacity. Outlet conduit 57 of the helical conduit 28' in this example, is returned upwardly and coaxially of the helical conduit 28' to exit from the top of the water heater 10'. Coil 26 extends vertically substantially the full length of upper casing compartment 16' in which heating element 58 is mounted adjacent the bottom region thereof along with aquastat 44'. In this example immersion heating element 58 is approximately equal in capacity to immersion heating element 60 located in the primary heating compartment 18' of the hot water heater 10'.

A plurality of riser pipes 62, with two being employed in this example of the invention, are extended through partition 20' to couple the upper or outlet region of the primary heating compartment 18' with the upper or inlet region of the heat exchange components 16'. The risers 62 are located in this example in the annular space between helical conduit 28' and the walls of heat exchange compartment 16'. On the other hand, the lower region of the heat exchange component 16' is coupled to the lower region of the primary heating component 18' by a central return or downcomer pipe 64. The downcomer 64 in this example is disposed coaxially of helical conduit 28'. The recirculation of heat exchange water through the hot water heater 10' is in the direction denoted by flow arrows 66, 68 and 70.

It will be understood, of course, that the numbers and locations of the riser pipes 62 and return pipe 64 can be varied depending upon the capacity and space limitations of the hot water heater 10'. If desired, the hot water heater 10' can be provided with a reducing valve 72 in the conduit between outlet 30' of heating coil 26', inlet 34' of storage tank 38'. A cold water mixing valve 74 is coupled in the return from the storage tank 38'.

Because of the greater capacity of the water heater 10', we have found that the greatest increase in efficiency is obtained by employing a secondary heating element 58 of approximately the same capacity as that of the primary heating element 60. The secondary heating element 58 is arranged to preheat the circulating heat exchange water in the coolest portion of the heat exchange compartment 16' before the water is returned to the primary heating compartment 18' and to the primary heating element 6.

On the other hand, we also obtain a marked increase in efficiency by making the liquid volume of the primary heating compartment 18' approximately equal to the total liquid volume of the helical coil 28', as described heretofore in connection with the heating coil 28 and compartment 18 of FIGURES 1 and 2.

To illustrate the performance of our novel water heater, tests were performed thereon which conformed to the testing standards established by the American Standards Association. Water was introduced into the water heater at a temperature of 48° F. The heater was allowed to reach a steady cyclic operation with its aquastat set to give a water temperature at the top of the tank of 150° F. Immediately following the aquastat cut-out water was drawn off at the rate of one gallon per minute. Withdrawal of water in this manner continued until the aquastat closed the circuit. Seven subsequent withdrawals were made at various times during the day. The following results were obtained:

|  | Kw.-hr. | Gal. Drawn | Temp., °F. In | Temp., °F. Out |
|---|---|---|---|---|
| Thursday, Time: |  |  |  |  |
| 10:05 a.m. | 20⅓ | 20 | 48 | 136 |
| 11:21 a.m. | 24⅓ |  |  |  |
| 11:25 a.m. | 24⅓ | 20 | 48 | 138 |
| 12:44 p.m. | 28⅓ |  |  |  |
| 12:45 p.m. | 28⅓ | 20 | 48 | 136 |
| 2:15 p.m. | 32½ | 20 | 48 | 138 |
| 3:28 p.m. | 36⅓ | 20 | 48 | 136 |
| Friday, Time: |  |  |  |  |
| 10:20 a.m. | 43½ | 20 | 50 | 132 |
| 11:58 a.m. | 48½ |  |  |  |

From the tabulation of test results, it has been established that the operating efficiency of our novel water heater averaged about 89%.

From the foregoing it will be apparent that novel and efficient forms of domestic water heaters have been described herein. While I have shown and described certain preferred embodiments of the invention and have illustrated presently preferred methods of practicing the same it is to be distinctly understood that the invention is not limited thereto but may be otherwise variously embodied and practiced within the scope of the following claims.

We claim:
1. A water heating device comprising a single sealed tank, a single upper heat-exchange compartment and a single lower heating compartment, heat-producing means in said lower compartment, heat-exchanging means mounted in said upper compartment and coupled to external hot water utilizing equipment, means within said tank for circulating heat-exchanging fluid between said upper and said lower compartments and externally of said heat-exchanging means and of said heat-exchanging means, said upper and said lower compartments being sealed within said tank and from said heat-exchanging means and said-producing means, and the volume of said lower compartment being a minor fraction of the volume of said upper compartment for quick recovery of said heating device.

2. The combination according to claim 1 wherein auxiliary heat-producing means are mounted within said upper compart so that said heat-exchanging fluid is preheated in said upper compartment before being returned to said lower compartment.

3. The combination according to claim 1 wherein said circulating means include at least one riser pipe coupling the upper region of said lower compartment with the upper region of said upper compartment and at least one return pipe coupling the lower region of said upper compartment with the lower region of said lower compartment.

4. A water heating device comprising a tank, an upper heat exchanging compartment and a lower heating compartment, heat-producing means in said lower compartment, heat exchange means mounted in said heat exchange compartment and coupled to external hot water utilizing equipment, at least one riser pipe coupling the upper region of said lower compartment with the upper region of said upper compartment, and at least one return pipe coupling the lower region of said upper compartment with the lower region of said lower compartment, and auxiliary heat-producing means mounted within the lower region of said upper compartment so that heat-exchange water circulating through said upper compartment is preheated in said upper compartment lower region before being returned to said lower compartment.

5. A water heating device comprising a tank, an upper heat exchanging compartment and a lower heating compartment, heat-producing means in said lower compartment, heat exchange means mounted in said heat exchange compartment and coupled to external hot water utilizing equipment, at least one riser pipe coupling the upper region of said upper compartment, and at least one return pipe coupling the lower region of said upper compartment with the lower region of said lower compartment, the volume of output water contained within said heat exchanger means being about equal to the volume of heat exchange water contained within said lower compartment.

6. The combination according to claim 2 wherein the volume of output water contained within said heat exchanger means is about equal to the volume of heat exchange water contained within said lower compartment.

7. The combination according to claim 4 wherein the heating capacity of said auxiliary heat-producing means varies from about half that of said first mentioned heat-producing means to a capacity about equal to that of said first mentioned heat-producing means.

8. The combination according to claim 3 wherein said heat exchange means includes a helical conduit, and said riser pipe is mounted centrally of said heat exchange compartment and said helical conduit.

9. A water heating device comprising a tank, an upper heat exchanging compartment and a lower heating compartment, heat-producing means in said lower compartment, heat exchange means mounted in said heat exchange compartment and coupled to external hot water utilizing equipment, at least one riser pipe coupling the upper region of said lower compartment with the upper region of said upper compartment, at least one return pipe coupling the lower region of said upper compartment with the lower region of said lower compartment, said heat-exchange means including a helical conduit substantially co-extending with the length of said heat exchange compartment but spaced inwardly thereof, and a plurality of riser pipes coupling the upper region of said lower compartment with the upper region of said heat-exchange compartment, said riser pipes being located in the space between said helical conduit and the walls of said heat-exchange compartment, and said return pipe being disposed below but substantially co-axially of said helical conduit.

10. The combination according to claim 9 wherein said helical conduit is provided with an outlet conduit extending from the lower end thereof and upwardly and co-axially of said helical conduit.

References Cited

UNITED STATES PATENTS 2,789,575   4/1957   Miller _____ 122—33 XR

FOREIGN PATENTS 1,298,253   5/1962   France.

KENNETH W. SPRAGUE, Primary Examiner